United States Patent [19]
Schnabel

[11] 3,755,067
[45] Aug. 28, 1973

[54] ASBESTOS FIBER EXTENDED PHENOLIC ADHESIVES
[75] Inventor: Adolph Schnabel, Ringoes, N.J.
[73] Assignee: Johns-Manville Corporation, Greenwood Village, Colo.
[22] Filed: Oct. 13, 1971
[21] Appl. No.: 189,001

[52] U.S. Cl............... 161/262, 260/17.2, 260/29.3, 260/38
[51] Int. Cl... B32b 21/02, C08g 51/24, C08g 51/18
[58] Field of Search.................... 260/17.2, 29.3, 38; 161/262

[56] References Cited
UNITED STATES PATENTS
1,085,100   1/1914   Baekland ........................... 260/29.3
1,200,731   10/1916  Jones .................................. 260/38

Primary Examiner—William H. Short
Assistant Examiner—Edward Woodberry
Attorney—Robert M. Krone et al.

[57] ABSTRACT

Processed asbestos fiber is utilized as a viscosity and thixotropy control agent in an improved water-resistant phenolic resin, wood laminating adhesive. An alkaline catalyst, pressure-digested lignocellulose and secondary extenders such as wheat flour may also be incorporated in the composition.

10 Claims, No Drawings

ASBESTOS FIBER EXTENDED PHENOLIC ADHESIVES

FIELD OF THE INVENTION

This invention relates to the use of processed asbestos fibers as a viscosity and thixotropy control agent in the preparation of alkaline phenolic adhesives and to plywood that is bonded with the novel adhesive composition.

BACKGROUND OF THE INVENTION

As is well known, plywoods are manufactured by joining layers or plies of wood veneer or of wood veneer and a lumber core with a suitable adhesive. The most commonly used adhesives are thermosetting phenol-formaldehyde and urea-formaldehyde resins. The urea-formaldehyde resins are restricted to use in interior grade plywood because they lack water resistance. The phenol-formaldehyde resins are used for exterior grade and marine plywood. Such plywoods are resistant to water, even to boiling water. In order to reduce the cost of the phenol-formaldehyde resins, fillers have been used to extend the resins. The fillers most often used with phenolic resin adhesives are woody (lignocellulosic) materials that are very finely divided. Typical fillers are walnut shell flour, selected barks, and lignocelluloses produced by the pressure digestion of the acidified residue remaining after extraction of furfural from corn cobs, oat hulls, and rice hulls. In order to provide adequate bond strength, the use of these organic fillers has been limited to about 15–20 percent of the total composition as a maximum. Even at these relatively high filler percentages, it has not been possible to obtain the viscosity and thixotropy control which is desirable in phenolic resin adhesive formulations.

Thixotropic adhesives undergo reversible gel-sol transformation under isothermal shearing stress followed by rest. A thixotropic adhesive possesses several advantages in bonding plywood veneers. In the lower viscosity range, there is less tendency for a solid extender material to settle to the bottom of the mixture when the mixture is allowed to stand. Another advantage of a thixotropic adhesive is the fact that the difference in spread weight of the adhesive needed for one core veneer to another core veneer due to differences in the wood has been found to be less pronounced.

After being spread, the lower viscosity thixotropic adhesives do not soak into the core veneer excessively because with the cessation of agitation, the gel forces restore themselves to produce better gluing efficiency. The gel forces in the spread film cause the film to retain its spread pattern, which ordinarily is an imprint of the grooving of the spreader roll rather than flowing out in a flat film. Because a plywood production press may require up to two hours to load, it is essential that the glue line does not dry out due to water evaporation or absoprtion into the wood plies.

In addition to providing thixotropic properties, a phenolic resin adhesive filler ideally should perform the following functions:

1. Because the plywood production press may require up to two hours to load, it is essential that the adhesive filler aid in water retention of the glue line. The adhesive filler should aid in water retention so that the glue line does not dry due to water evaporation or absorption into the wood plies.

2. When using phenol-aldehyde adhesives, it is desired to prolong the time period of the condensation reaction in the water soluble phase and to shorten the time period of the final reaction, that is, the conversion of the resin into an insoluble solid product. Thus, the phenolic resin adhesive filler should accelerate the adhesive cure time. However, the most widely used lignocellulose fillers have tended to retard cure time.

3. The phenolic resin adhesive filler should not aggravate the abrasiveness of the glue line. That is, the glue line containing the filler should not have a detrimental dulling effect on saw blades used to cut plywood panels to size.

No filler fulfilling all of the above criteria has been provided to the industry. Despite continuing research efforts to find filler material which will fulfill more the requirements mentioned, there is considerable room for improvement. The most common filler material currently used in exterior grade plywood adhesives is lignocellulose produced by the pressure digestion of the acidified residue remaining after extraction of furfural from corn cobs, oat hulls, and rice hulls. However, because of its adverse effect on bond strength at high weight percentages, such a filler is not used at high enough weight percentages to provide good thixotropic properties. Further, this type of filler tends to retard the cure time of the adhesive composition.

In the search for a better filler material for exterior grade plywood adhesives, it has previously been proposed to use an asbestos-containing material having a very low fiber content. However, this low fiber content material did not provide good viscosity building characteristics, and did not achieve significant usage in phenolic resin adhesive systems.

BRIEF DESCRIPTION OF THE INVENTION

The present invention provides an improved extended phenolic resin adhesive formulation comprising 4 to 11 parts by weight of processed asbestos fiber per 70 parts of phenolic resin and sufficient water to produce a flowable mixture. Preferably, a source of alkali is also present.

The processed asbestos fiber should have a kerosene retention of at least 4.25 gm/10 gm of asbestos fiber as measured by a compression kerosene test described below.

In the compression kerosene test, 10 grams of fiber and 20 cc of kerosene are mixed together to form a slurry which is placed in a one inch diameter cylindrical mold having a loose fitting plug at the bottom. The loose fitting plug permits the kerosene to be expressed during the test, but retains the fiber within the mold. The slurry is compressed in the mold under 68 lbs. force for 10 minutes. The force compresses the fiber and tends to accelerate drainage of the kerosene from the mold. The retained kerosene and fiber in the mold are then weighed and kerosene retention is determined by subtracting 10 from the total weight of fiber and retained kerosene. The results of the compression kerosene test are reported in the Examples of this application as a dimensionless value, but actually reflect grams of kerosene retained per 10 grams of asbestos fiber.

Processed asbestos fibers that possess the requisite degree of fibrillation as measured by the kerosene retention test usually comprise at least 50 percent fiber as measured by the air classification test at areas up to about 10,000 cm$^2$/gm. At higher surface areas, about 10,000 cm²/gm, the fiber content as shown by the air classification test can diminish towards 0.

The inclusion of processed asbestos fiber into phenolic resin adhesives unexpectedly provides highly viscous, and thixotropic compositions which possess adhesive qualities which are generally equal to or better than the bond strength produced by commercially utilized plywood adhesive filler materials. Further, to the extent tested, the inclusion of asbestos fibers does not appear to have an excessively detrimental effect on the abrasiveness of the glue line, which means that plywood panels bonded with the new adhesive compositions can be readily sawed without increasing the dulling rate of the saws used.

DETAILED DESCRIPTION OF PREFERRED EMBODIMENTS

The present invention provides an improved water resistant, laminating adhesive comprising phenolic resin, short processed asbestos fiber that provide superior viscosity building and thixotropic properties, and sufficient water to provide a flowable mixture. The adhesive composition preferably contains an alkaline material, and can also contain conventional water dispersible organic fillers and extenders such as lignocellulose and wheat flour. These extenders are preferably causticized.

The terminology "short processed asbestos fiber" as applied to the viscosity and thixotropy control agents of this invention means that the asbestos fibers are characterized by containing less than 1 percent of +14 mesh and at least 75 percent of −200 mesh as measured by the McNett test. Both chrysotile and amphibole asbestos can be utilized with Grade 7 chrysotile fibers being presently preferred. (The grade designation refers to the conventional Quebec Asbestos Mining Association system.)

The processed asbestos fibers of this invention are further characterized by possessing a kerosene retention of at least (4.25 gm)/(10 gm of asbestos material), and preferably retain from (4.50 to 8.00 gm)/(10 gm of asbestos material) in the compression kerosene test.

Phenolic resins suitable for employment in the invention are thermosetting, base catalyzed, resinous condensation products (soluble in aqueous solvents) of one or more hydroxy aromatic compounds (phenols) and one or more suitable aldehydic materials. Aldehydic, as employed herein, refers to aldehydes and similarly acting materials. From about 1.8 to about 3, preferably from 2.0 to 2.3 chemical equivalents of the aldehydic material are reacted with each mole of the phenol used. Particular resinous products are obtained by partially condensing, in appropriate proportions to provide a thermosetting product, a phenol, such as phenol, cresol, resorcinol or 3,5-xylenol with a suitable aldehydic material. Specific examples of suitable aldehydes, or similarly acting materials, are aqueous formaldehyde, para-formaldehyde, trioxymethylene and the like methylene providing materials. Also operable are acetaldehyde, furfuraldehyde and the like aldehydic materials which react with the mentioned phenols to form soluble, intermediate, polycondensation products.

The above thermosetting phenolic resins are normally prepared in the presence of an aqueous solvent with the aid of a basic catalyst. The usual procedure is to mix desired proportions of the resin forming reactants into a sufficient amount of an aqueous solvent to provide a liquid reaction system having from about 30 to about 60 percent by weight solids. A basic catalyst is added to the reaction mixture and the resulting system is heated at an elevated temperature to provide a partially condensed, fusible resin, which is at least water-dispersible, if not completely water-soluble, in the presence of alkali. Exemplary aqueous solvents include in addition to water, mixtures of water with water-soluble alcohols and ketones. Generally, any organic solvent miscible with water and essentially inert to the condensing reactants can be used as the reaction medium.

The water-dispersible, preferably causticized organic extender, mentioned above as a component of the standard phenolic resin formulation, may be completely soluble in water, or merely swellable therein, but in any event, is capable of forming a homogeneous dispersion in water. Organic materials that can be suitably causticized by treatment with an alkali metal hydroxide to provide the causticized organic extenders include amylaceous materials, i.e., containing starches, such as may be obtained by processing wheat, corn, oats, rye and the like grains. Other sources of causticizable organic materials are the residues obtained by chemical treatment of oat hulls, corn cobs and the like remnants of grain processing. Wood and walnut shell flours and wood bark with solubles extracted also can be causticized. The amount of the alkali metal hydroxide used to causticize the aforementioned organic materials will normally fall within the limits from about 5 to about 35 percent by weight of the organic materials to be causticized.

It should be understood that standard phenolic resin adhesive formulations used in conjunction with processed asbestos fibers according to one embodiment of the invention may, and often do, involve the use of causticized forms of more than one of the aforementioned organic materials. For instance, it will be recognized by those skilled in the art that causticized forms of certain of the aforementioned organic materials can be added to the formulation as thickeners or glue line control agents as well as extenders for the resin solids. Moreover, still other organic materials are often used as optional thickeners. Examples of these materials are the naturally occurring and synthetic water-soluble gums such as gum arabic, karaya gum, locust bean gum, alginate, casein, soluble blood albumin and water-soluble cellulose ethers.

Regardless of the purpose for which it is added, enough of the water-dispersible organic extender may be employed to provide from 0.01 up to as much as 0.25 part by weight thereof per part by weight of resin solids in the final adhesive formulation. For best results with the asbestos fiber extenders of the invention, it is preferred to maintain the extension with the water-dispersible organic extenders within the range from about 0.05 to 0.10 part by weight thereof per part by weight of the resin solids.

Another preferred component of the adhesive formulations of the invention is a small, but catalytically effective, amount of a catalyst for thermosetting or curing the phenolic resin. Examples of suitable basic catalysts are the alkali metal hydroxides (an excess of the alkali metal hydroxide used to causticize the organic extender is satisfactory). A preferred catalyst system utilizes an alkali metal hydroxide in an amount of from about 2 to 20 percent by weight of the resin solids.

The solid components of the adhesive formulation of the invention are dispersed or dissolved, as the case may be in a sufficient amount of an aqueous solvent medium, which may be water or mixtures thereof with a water-soluble alcohol, to provide a readily flowable or mechanically spreadable composition.

The proportions of phenolic resin, processed asbestos fiber and water usually in the composition of the invention generally fall within the following range 70 parts phenolic resin solids, from 4 to 11 parts of processed asbestos fiber and from 13 to 16 parts water.

The adhesive formulations prepared in accordance with the invention are particularly well adapted for the bonding of wood veneers to provide plywoods. Such adhesive formulations are spread on the wood plies in amounts ranging from about 55 to about 85 pounds of adhesive (including water) per thousand square feet of double glue line, with southern pine customarily requiring more adhesive than wood from the northwest part of the United States. The assembly time can vary from about 5 to about 30 minutes or more and preferably from 10 to about 20 minutes. A hot press cure using steam-heated platens is recommended. The press time for satisfactory results can be within the range from about 3 to about 10 minutes or more depending upon the temperature of the platens, the plies being bonded, the number of panels per opening and other considerations, such as are apparent to those skilled in the art. After having been pressed and thoroughly cured at the bonding temperature for the glue formulation, the plywood is removed from the press and stacked for conditioning to a suitable residual mositure content. In a preferred embodiment of the invention, the formulated adhesive composition has a thixotropic index of at least 5.

For a better understanding of the invention, the following examples are provided. These examples are intended to be illustrative and should not be construed as limiting the invention. All parts and percentages listed in the specification and claims are by weight unless otherwise noted.

EXAMPLES 1–11

A series of three-ply, plywood specimens are constructed consisting of a face veneer, a back veneer, and a 0.1-inch core veneer in the usual construction for plywood test panels. The wood veneers are conditioned to a 6–8 percent moisture content prior to the application of the glue line.

Phenolic resin is converted into a plywood adhesive using standard adhesive mixing equipment. Mixing is performed in the following sequence. Fifty-five parts of water, 25 parts of a viscosity and thixotropic control agent (asbestos fiber, lignocellulose, or a combination of these agents), and 14 parts of wheat flour (Glu-X sold by the Robertson Corporation) are mixed for 5 minutes in a closed container. Subsequently, 35 parts of phenolic resin is added to the mixture and the admixture is mixed for 5 more minutes. Then, 12 parts of 50 percent sodium hydroxide solution is added and the admixture is mixed for 15 minutes more. Subsequently, 205 parts of phenolic resin (a phenol of formaldehyde resin sold by Georgia Pacific under the designation GP-152C) is added and the mixture is mixed for 5 minutes more.

The temperature of the resulting adhesive mixture is adjusted to 80°F and the Brookfield viscosity of the mixture is determined at 4 and 20 r.p.m. The adhesive mixtures of these examples are either used immediately, or sealed and stored at 40°F until ready for use.

A control plywood specimen is formed using an adhesive composition containing pressure digested lignocellulose, sold under the trademark "Furafil" by the Quaker Oats Company, as the viscosity and thixotropy control agent in the adhesive formulation. In each of Examples 1–11, the viscosity and thixotropy control agent includes short processed asbestos fiber.

The physical characteristics of the asbestos fibers used in Examples 1–11 are shown in Table 1 below.

TABLE I.—FIBER DATA

|  | Type A | Type B | Type C | Type D | Type E |
|---|---|---|---|---|---|
| Surface area, cm.$^2$/gm | 10,300 | 12,400 | 23,000 | 27,800 | 35,200 |
| C.K.T.* | 4.90 | 4.68 | 5.69 | 7.62 | 7.52 |
| Fiber color: |  |  |  |  |  |
| Amber | 62.0 | 52.0 | 56.5 | 66.0 | 67.5 |
| Blue | 62.5 | 52.0 | 58.0 | 66.5 | 68.5 |
| Green | 63.0 | 53.0 | 56.5 | 68.0 | 69.0 |
| McNett, percent: |  |  |  |  |  |
| Plus 14 mesh | 0.7 | 0.1 | 0.1 | 0.1 | 0.1 |
| Plus 35 mesh | 1.0 | 0.2 | 0.2 | 0.3 | 0.1 |
| Plus 100 mesh | 10.0 | 0.9 | 1.0 |  | 2.1 |
| Plus 200 mesh | 12.6 | 3.7 | 3.4 | 7.8 | 5.0 |
| −200 mesh | 75.7 | 95.1 | 95.5 | 91.8 | 92.7 |
| Alpine, percent: |  |  |  |  |  |
| Fines | 64.2 | 94.7 | 76.0 | 56.1 | 91.1 |
| Fiber | 32.0 | 5.2 | 23.8 | 43.8 | 7.0 |
| Rock | 3.8 | 0.1 | 0.2 | 0.1 | 1.9 |

*C.K.T.=Compression kerosene test.

The Brookfield viscosity for each of the compositions of Examples 1–11 and the control is ascertained at a spindle speed of 4 and 20 r.p.m. and the thixotropic index is computed with results shown in Table 2 below.

TABLE 2.—VISCOSITY BUILDING DATA

| Example | Fiber | Parts of asbestos fiber | Parts of lignocellulose | Viscosity and thixotropic index | | |
|---|---|---|---|---|---|---|
|  |  |  |  | $V_L$C.P.S. | $V_H$C.P.S. | $V_L/V_H$ |
|  | Furafil [1] | 0 | 25 | 15,000 | 7,200 | 2.1 |
| 1 | Type A | 25 | 0 | 108,000 | 32,250 | 3.3 |
| 2 | Type A | 12.5 | 0 | 85,000 | 19,750 | 4.3 |
| 3 | Type A | 8 | 0 | 52,500 | 13,000 | 4.0 |
| 4 | Type B | 25 | 0 | 88,750 | 29,000 | 3.1 |
| 5 | Type B | 12.5 | 0 | 85,000 | 19,250 | 4.4 |
| 6 | Type B | 8 | 0 | 45,000 | 10,500 | 4.3 |
| 7 | Type C | 25 | 0 | 63,750 | 24,750 | 2.6 |
| 8 | Type C | 12.5 | 0 | 45,000 | 12,250 | 3.7 |
| 9 | Type C | 8 | 0 | 25,000 | 6,500 | 3.8 |
| 10 | Type D | 12.5 | 0 | 167,500 | 29,000 | 5.8 |
| 11 | Type E | 12.5 | 0 | 162,500 | 33,750 | 4.8 |

[1] Control lignocellulose.
$V_L$=Brookfield viscosity at 4 r.p.m. spindle speed.
$V_H$=Brookfield viscosity at 20 r.p.m. spindle speed.
Thixotropic index=$V_L/V_H$.

The adhesive compositions prepared in accordance with the invention and the control were spread on one side of a face and back veneer of southern pine obtained from the Georgia-Pacific Corporation at a 40-lb./1000 sq. ft. loading per glue line. The plywood construction is then closed enclosing a piece of 0.1inch core veneer between the glue-coated sides. The grain of the core veneer is at a right angle to the two face veneers. The glued constructions are aged 15, 30, 60 and 120 minutes before pressing. The aged glued plywood assemblies are pressed in a temperature controlled steam-heated platen press. The platen temperature is maintained at 300°F, and the press cycle is 4 minutes at 200 psi.

All plywood specimens are tested according to the American Plywood Association, U. S. Products Standards PSI-66 4.4.2 (pressure-vacuum test) and PSI 1-66 4.4.3 (boiling water test). Kerfed 1-in. × 3-in. test specimens are prepared according to PS 1-66 4.4.1. The results of these tests are shown in Table 3 below. Table 3 compares the results of samples made in accordance with Examples 1–11 with the lignocellulose- ("Furafil") control.

TABLE 3

Laminant Bond Test Results

| Example | psi-66 4.4.3 boiling water test laminant bond open time in min. | | | | psi-66 4.4.2 vacuum pressure test laminant bond open time in min. | | |
|---|---|---|---|---|---|---|---|
|  | 15 | 30 | 60 | 120 | 30 | 60 | 120 |
| 1 | + | + | + | + | + | + | + |
| 2 | — | — | = | + | = | + | + |
| 3 | — | — | + | = | = | = | = |
| 4 | + | + | + | + | + | + | + |
| 5 | — | = | = | + | = | + | = |
| 6 | = | — | = | + | — | — | = |
| 7 | + | = | + | — | — | + | + |
| 8 | — | — | = | — | + | = | + |
| 9 | — | — | + | = | — | + | + |
| 10 | + | = | — | + | + | = | + |
| 11 | = | = | = | = | + | + | + |

+ Bond better than control (equal open time)
= Bond equal to control (equal open time)
— Bond poorer than control (equal open time)

The asbestos fibers are effective in greatly increasing the viscosity of a plywood phenolic laminating adhesive without adversely affecting the adhesion. Adhesives filled with asbestos fibers are highly thixotropic which permits their use at very high viscosity levels, without causing problems in materials handling.

A saw blade used to cut the fiber-filled adhesive laminated plywood of Examples 1–11 is examined and shows little, if any, dulling of the blade. The last cut made is still clean and sharp, also indicating minimum saw blade dulling.

Examples 1–11 show that the processed asbestos fibers are effective viscosity and thixotropy control agents in the preparation of alkaline phenolic adhesives. Adhesives formulated in accordance with the invention provide generally comparable or better bonding strengths than attained using a commercial adhesive formulation, and to the extent tested, do not adversely affect the ease of cutting of the adhesively bonded plywood product.

EXAMPLES 12–26

In a series of comparative tests, the viscosity building properties of short processed asbestos fiber containing a high proportion of fiber is shown to be outstandingly superior to the viscosity building ability of a low grade asbestos ore material containing a low fiber content.

The tests are performed using as fillers two types of short processed chrysotile asbestos fiber meeting the desired criteria with respect to fiber content and one low grade asbestos material. Examples 12-26 incorporate Type A fiber, and Examples 17-21 incorporate Type B fiber having the physical properties shown in Table 1 above.

The low grade fiber was Clute fiber from Napa, Calif. and has the following properties:

| | |
|---|---|
| surface area - cm²/gm | 8,200 |
| compression kerosene test | 3.74 |
| air analysis | |
| % Fiber | 2.4 |
| Fines | 78.6 |
| Rock | 19.0 |

Various amounts of the three types of fiber are incorporated along with a phenolic resin ("Bakelite No. 3087" sold by Union Carbide) and solvent to form adhesive compositions containing 44 percent by weight of resin solids.

The excellent viscosity building characteristics for the composition containing short processed asbestos fiber in accordance with the invention (Examples 12–21) are shown in Table 4 below and are contrasted with the poor results obtained using a low fiber content material as shown in Examples 22–26.

TABLE 4

Viscosity and Thixotropic Index - Brookfield Viscometer

| Ex. | % Fiber | Fiber | No. 6 spindle - cps 2 R.P.M. | 20 R.P.M. | Thixotropic Index |
|---|---|---|---|---|---|
| 12 | 3 | Type A | 2,500 | 400 | 6.25 |
| 13 | 5 | Type A | 5,000 | 1,600 | 3.13 |
| 14 | 7 | Type A | 17,000 | 2,750 | 6.18 |
| 15 | 10 | Type A | 25,000 | 5,550 | 4.50 |
| 16 | 15 | Type A | 45,000 | 10,900 | 4.13 |
| 17 | 3 | Type B | 2,500 | 500 | 5.00 |
| 18 | 5 | Type B | 6,000 | 1,400 | 4.29 |
| 19 | 7 | Type B | 12,500 | 2,750 | 4.55 |
| 20 | 10 | Type B | 16,000 | 5,450 | 2.94 |
| 21 | 15 | Type B | 53,000 | 10,250 | 5.17 |
| 22 | 3 |  | 500 | 100 | 5.00 |
| 23 | 5 | low | 500 | 150 | 3.33 |
| 24 | 7 | grade | 1,000 | 200 | 5.00 |
| 25 | 10 | fiber | 1,500 | 250 | 6.00 |
| 26 | 15 |  | 2,000 | 400 | 5.00 |

In addition to the superior viscosity building and adhesive properties that can be attained in accordance with the invention, the incorporation of short processed asbestos fiber into phenolic adhesive compositions helps provide a degree of insensitivity to the plywood assembly line parameter.

What is claimed is:

1. A water-resistant wood laminating adhesive comprising:
   a. about 70 parts of phenolic resin;
   b. about 4 to 11 parts of short processed asbestos fiber per 70 parts of said resin, said fiber having a kerosene retention of at least (4.25 gm)/(10 gm of asbestos fiber) in a compression kerosene test; and
   c. sufficient water to provide a flowable mixture.

2. The adhesive of claim 1 in which the processed asbestos fiber has a kerosene retention of (4.50 to 8.00 gm)/(10 gm of asbstos fiber)

3. The adhesive of claim 1 in which the composition contains from 4 to 11 parts asbestos fiber, and up to 7 parts of pressure digested lignocellulose.

4. The adhesive of claim 3 which includes 1.4 to 14 parts of a water-soluble alkali metal or alkaline earth metal hydroxide.

5. The adhesive of claim 3 which consists essentially of 70 parts of phenolic resin; 4–11 parts of asbestos fiber; 0–7 parts of pressure digested lignocellulose with the total parts of asbestos fiber and lignocellulose being about 11, about 5 parts of wheat flour and about 5 parts of fifty percent aqueous NaOH; and sufficient water to provide a spreadable composition.

6. The adhesive of claim 1 in which the processed asbestos fiber is a Grade 7 chrysotile fiber.

7. The adhesive of claim 1 having a thixotropic index of at least 5.

8. Exterior grade plywood bonded with an adhesive composition that comprises:
   a. 70 parts of phenolic resin; and
   b. 4 to 11 parts of processed asbestos fiber having a kerosene retention of at least (4.25 gm)/(10 gm asbestos fiber)

9. The product of claim 8 in which the adhesive composition consists essentially of 70 parts of phenolic resin; 4–11 parts of asbestos fiber; 0–7 parts of pressure digested lignocellulose with the total parts of asbestos fiber and lignocellulose being about 11, about 5 parts of wheat flour and about 5 parts of 50 percent aqueous NaOH.

10. The product of claim 8 in which the processed asbestos fiber is a Grade 7 chrysotile fiber.

* * * * *

UNITED STATES PATENT OFFICE
CERTIFICATE OF CORRECTION

Patent No. 3,755,067      Dated  August 28, 1973

Inventor(s) ADOLPH SCHNABEL

It is certified that error appears in the above-identified patent and that said Letters Patent are hereby corrected as shown below:

Column 2, line 39, "fiber" should read -- fibers -- ;

line 67, "about", second occurrence, should read -- above -- .

Signed and sealed this 20th day of August 1974.

(SEAL)
Attest:

McCOY M. GIBSON, JR.
Attesting Officer

C. MARSHALL DANN
Commissioner of Patents